United States Patent Office 3,474,055
Patented Oct. 21, 1969

3,474,055
HOT MELT ADHESIVE CONTAINING A HIGH MELTING POLYHYDROXY COMPOUND
William P. Dooley, Philadelphia, Pa., assignor to Sun Oil Company, Philadelphia, Pa., a corporation of New Jersey
No Drawing. Filed Nov. 10, 1966, Ser. No. 593,264
Int. Cl. C08g 49/04; C08f 37/16; C09j 3/16
U.S. Cl. 260—17.4        15 Claims

ABSTRACT OF THE DISCLOSURE

This invention relates to hot melt adhesive compositions. In particular, it relates to hot melt adhesive compositions with improved repulping properties produced from low-cost materials and suitable for bonding a variety of materials. The improved repulpability is achieved by the use of high melting polyhydroxy crystalline compounds in hot melt adhesives comprising a formolite resin and an ethylene-vinyl acetate copolymer.

BACKGROUND OF THE INVENTION

Hot melt adhesives produce a bond by mere cooling as distinguished from cross-linking or other chemical reactions. Prior to heating, the hot melt adhesives are solids that can be prepared in bulk or pellet form for ease of handling. Upon heating, the hot melt adhesive composition melts and flows freely for application to a substrate. Since the hot melt adhesives of the present invention are thermoplastic rather than thermosetting, and thus remeltable, they can be applied to a substrate at one time and later remelted to form a hot melt bond with another substrate.

Hot melts are useful adhesives for bonding wood, paper, plastics, textiles and other materials. One use for which they are well suited is the fabrication of corrugated paper board. Hot melts used for producing corrugated paper board must have high bond strength under conditions of shock, stress, high humidity and extremes of temperature encountered in transportation and storage. In addition, the melt point, wetting time, initial tack, setting time, pot life and general handling qualities on automatic corrugated board machinery are essential considerations.

It has been the practice in the production of corrugated paper board to employ water soluble adhesives which are generally starch or sodium silicate based. It is another general practice in the paper industry to recover the used and waste corrugated material and repulp it for preparation of other materials such as cardboard. Water soluble adhesives are applied in water emulsions and this has presented problems in regard to the speed at which corrugated paper board can be produced, since the water must be removed from the combined corrugated board.

In order to overcome the problem of water removal recourse has been taken to hot melt adhesives which allow the preparation of corrugated board at extremely high rates of speed. Such a process is shown in the inventor's application Ser. No. 473,581, filed July 21, 1965, now U.S. Patent No. 3,426,909. For their advantage of speed and good bonding, the hot melt adhesives employed previously do not repulp satisfactorily.

Repulping involves fiberizing or disintegrating the waste paper in water to form a slush of separated fibers in a beater of the hollander type such as a Hydropulper, Vortex beater or the like. For certain application refining may be employed instead of beating. Refining is similar to beating in that essentially the same physical changes occur but to a greater degree, in order to produce more highly processed grades of paper. Fillers, sizers and color pigments may be added directly to the stock from beating or finishing.

In one method the stock containing any added materials is formed into a wet belt which essentially involves running a dilute suspension of fibers onto the surface of a moving endless belt of wire cloth. This is the Fourdrinier process. Part of the water drains by gravity, part by pressure. The remaining water is removed in a dryer section by additional pressure and heat to form paper web or sheet.

The entire paper process is in fact rather complicated having evolved over centuries, and the adhesive employed will have to fit into this system.

It has been found that suitable hot melt adhesives, that is, those that operate well on corrugating machinery and produce satisfactory corrugated board, when repulped and employed in a process such as the Fourdrinier process produce some large particles that tend to stick in and block the openings in the wire belt. Thus after a few revolutions of the endless wire belt, it becomes seriously clogged and unusable. Other smaller particles either pass through the wire belt or are incorporated into the wet sheet.

DESCRIPTION OF THE INVENTION

The present invention relates to improved repulpability of hot melt adhesive compositions by adding to otherwise acceptable hot melt compositions 5 to 50 parts by weight of a water soluble crystalline polyhydroxy compound having a melting point of at least 100° C. preferably a water soluble crystalline polyhydroxy compound having a melting point of 120 to 250° C. In addition to having a suitable melting point and water solubility, the polyhydroxy compound must be stable at the temperature of compounding and use of the hot melt compositions. The term polyhydroxy is used to designate a compound having 3 or more hydroxyl groups per molecule, preferably 3 to 10 hydroxyl groups. Suitable polyhydroxy compounds will usually have a total of 4 to 18 carbon atoms.

More specifically the polyhydroxy compounds are preferably selected from the group consisting of polyhydric alcohols and saccharides. Included among the suitable polyhydric alcohols are trimethylolethane, erythritol, pentaerythritol, sorbitol, ribitol, D-arabitol, L-arabitol, anhydroenneaheptitol, allitol, dulcitol, D,L-glucitol, D-mannitol, L-mannitol, D,L-mannitol, glycero-gulo-hepticol, D-glycero-D-ido-heptitol, perseitol, volemitol, D-erythro-D-galacto-octitol and the like.

Suitable saccharides include principally the mono-, di-, and tri-saccharides. The higher molecular weight oligosaccharides and polysaccharides such as starch and cellulose are unsuitable for the present invention either because of amorphous structure or their tendency to decompose under the conditions of preparation and use of the hot melt adhesives. Suitable saccharides include D-xylose, D-arabinose, L-arabinose, D-mannose, D-glucose, lactose, gentiobiose, raffinose and the like.

It was found in commonly assigned U.S. Patent No. 3,419,641 issued Dec. 31, 1968, which is hereby incorporated by reference, that a high performance, low-cost, hot melt adhesive can be obtained by blending 35 to 75 parts by weight of an aromatic hydrocarbon-aldehyde (formolite) resin with 25 to 65 parts by weight of a copolymer of ethylene and vinyl acetate.

Subsequently, it was found that the creep properties of the corrugated board produced from the hot melt adhesive could be improved if a crystalline high melting wax were added to the hot melt adhesive. This is disclosed in U.S. patent application Ser. No. 539,298, filed Apr. 1, 1966, and is hereby incorporated by reference.

The compositions of the present invention essentially retain the desirable features and properties of formolite resin and ethylene-vinyl acetate copolymer blends as well as the improved creep properties of the compositions containing crystalline high melting wax, while improving the repulpability of corrugated board made with these compositions.

A suitable composition comprises 25 to 65 parts by weight of an ethylene-vinyl acetate copolymer having 17 to 42 weight percent vinyl acetate, 30 to 60 parts by weight of an aromatic hydrocarbon-aldehyde resin having a ring and ball softening point in the range of 70 to 150° C. and 5 to 40 parts by weight of a water soluble crystalline polyhydroxy compound.

The above compositions can contain in addition 10 to 25 parts by weight of a high melting crystalline wax. This is a preferred embodiment since the creep properties of this composition in addition to repulpability are quite good.

The preparation of ethylene-vinyl acetate copolymer is known in the art. Preparations are shown in U.S. Patent No. 2,200,429 to Perrin et al. and Canadian Patent No. 657,977 to Strauss dated Jan. 29, 1963. Generally the preparation involves copolymerizing a mixture of ethylene and vinyl acetate by means of a free-radical producing catalyst, such as oxygen, or an organic peroxide, at a pressure of 100 to 200 atmospheres and a temperature in the range of 150° C. to 250° C. and recovering the product. The proportion of vinyl acetate in the resin does not appear to be important in the instant compositions. Copolymers containing 17 to 42 weight percent vinyl acetate are suitable for use in the hot melt compositions; however, it is preferred that improved creep property compositions employ ethylene-vinyl acetate copolymers having 17 to 30 weight percent vinyl acetate. The ethylene-vinyl acetate copolymer can be further characterized as having ring and ball softening point of 180 to 390° F., inherent viscosity at 30° C. of 0.54 to 1.05.

The ethylene-vinyl acetate copolymers employed here are commercially available under the trademark Elvax. Properties of some specific Elvax compounds, including those employed in the examples, are set out in Table 1.

TABLE I

| Grade | Melt Index [1] | Percent Vinyl Acetate | Inherent Viscosity [2] | Density, g./cc.[3] | Refractive Index 25″D | Softening Point |
|---|---|---|---|---|---|---|
| ELVAX 40 | 45–65 | 39–42 | 0.70 | 0.965 | 1.476 | 200 |
| ELVAX 150 | 22–28 | 32–34 | 0.78 | 0.957 | 1.482 | 240 |
| ELVAX 210 | 340–470 | 27–29 | 0.59 | 0.951 | 1.488 | 180 |
| ELVAX 220 | 125–175 | 27–29 | 0.63 | 0.949 | 1.485 | 190 |
| ELVAX 240 | 22–28 | 27–29 | 0.78 | 0.951 | 1.485 | 250 |
| ELVAX 250 | 12–18 | 27–29 | 0.85 | 0.951 | 1.485 | 280 |
| ELVAX 260 | 5–7 | 27–29 | 0.94 | 0.954 | 1.485 | 310 |
| ELVAX 310 | 335–465 | 24–26 | 0.54 | 0.949 | 1.486 | 190 |
| ELVAX 350 | 16–22 | 24–26 | 0.84 | 0.947 | 1.489 | 280 |
| ELVAX 360 | 1.6–2.4 | 24–26 | 1.05 | 0.950 | 1.491 | 370 |
| ELVAX 420 | 125–175 | 17–19 | 0.54 | 0.937 | 1.492 | 210 |
| ELVAX 460 | 2.1–2.9 | 17–19 | 0.98 | 0.941 | 1.493 | 390 |

[1] G./10 min. (ASTM D 1238 modified).
[2] At 30° C. (0.25 g./100 ml. toluene).
[3] At 23° C. (ASTM D 1505).
[4] Ring and Ball, ° F. (ASTM E 28).

Aromatic hydrocarbon-aldehyde resins are well known in the art. Their preparation is described in many patents including U.S. Patent No. 1,827,538 and U.S. Patent No. 2,992,208, and in the literature, see for example Walker, Formaldehyde, 2nd Edition, Rheinhold Publishing Company, New York, 1960, pages 342–345.

Typical feedstocks for the formolite reaction include aromatic hydrocarbon fractions boiling in the range of from about 200° F. to 950° F., derived from petroleum refinery streams such as cracked fractions, cycle streams, hydroformer bottoms, fuel oil, straight run distillates and pure aromatic fractions. The gas oil fraction from catalytic cracking, boiling in the range of from about 450° F. to about 650° F. and containing 15 to 50% aromatic hydrocarbons is a particularly preferred feedstock.

Suitable pure aromatic hydrocarbons include for example benzene, alkyl benzenes, naphthalene, alkylnaphthalene, hydrogenated naphthalenes or mixtures of such pure aromatic hydrocarbons. Some specific aromatic hydrocarbons are benzene, toluene, ethylbenzene, diethylbenzene, naphthalene, alpha-methylnaphthalene, beta-methylnaphthalene, ethyl-naphthalene, tetralin and the like.

Suitable aldehydes are formaldehyde and materials which yield formaldehyde under the conditions of the reaction such as formalin, paraformaldehyde, trioxymethylene and trioxane. Of this group, formaldehyde and paraformaldehyde are preferred because of availability and handling ease. Other aldehydes such as acetaldehyde, propionaldehyde and butyraldehyde can be used. The aldehyde is used in amounts ranging from 1 to 30 weight percent based on the aromatic hydrocarbons in the charge.

Many catalysts have been used for the formolite reaction including $H_2SO_4$, HF, formic acid, phosphoric acid, $BF_3$, metal chlorides and other acid acting catalysts. It is preferred to use sulfuric acid or $BF_3$ in the presence of acetic acid. Acetic acid serves as a modifier for sulfuric acid or $BF_3$. Acetic acid appears to be the source of acetate groups sometimes found in the molecular structure of the formolite resin product.

In a typical run, 226 pounds of catalytic gas oil having a boiling range of 448° F. to 572° F. and containing 47.3% aromatics (gel) and 14 pounds of paraformaldehyde were placed in a 50 gallon glass-lined reactor equipped with an agitator. The mixture was heated to a temperature in the range of 190° F. to 230° F.

Next, 18 pounds of 96 weight percent sulfuric acid were slowly added to 55 pounds of glacial acetic acid with stirring and the acid mixture was slowly metered to the reactor with agitation.

The reaction mixture was stirred for about 30 minutes at a temperature ranging from 190° F. to 230° F. A closed system was used and the pressure slowly rose to about 32–33 p.s.i.g.

Heating was discontinued, the acid layer was removed by settling, and the reaction products were pumped hot to water washing facilities. The products were washed four times. Water was removed by settling and the reaction product was vacuum distilled. 30.7 pounds of hard resin were recovered. This represented a bottoms fraction boiling above about 500° F. at 1 mm. The material had a ring and ball melt point of 105° C. (220° F.). This resin and others similarly prepared were analyzed for acetate content and were found to contain from about .1 to about 1.0 acetate groups per molecule of formolite resin. Analysis was obtained by saponification number and infrared spectra.

If the distillation of the product is carried out at 10 mm. and 330° C. (626° F.) then the resin is found to have no acetate content. The presence or absence of residual acetate groups in the formolite type resin is of no importance in the present invention.

Hard resins having a ring and ball softening point of 70 to 150° C., preferably 90 to 140° C., are suitable aromatic hydrocarbon-aldehyde components.

The formolite type resins employed in the compositions of the invention can be characterized by certain hexane solubility properties. The solubility characterization involves a room temperature (25° C.) hexane insoluble fraction, a cold (0° C.) hexane insoluble fraction and a cold hexane soluble fraction. Such characterizations can be quite useful in compositions of an aromatic hydrocarbon-aldehyde resin and an ethylene-vinyl acetate copolymer since there were compatibility problems between the resin and copolymer depending on weight percent of room temperature insoluble fraction in relation to weight percent of vinyl acetate in the ethylene-vinyl acetate copolymer.

However, in the compositions of the present invention the problem of compatibility has not occurred to any appreciable extent and formolite type without regard to the hexane solubility characteristics thereof are compatible with ethylene-vinyl acetate copolymers without regard to the amount of vinyl acetate present therein to the extent that mixtures thereof according to the present invention are homogeneous mixtures which do not separate on standing hot.

The wax employed to achieve the good creep properties is a high melting crystalline wax that is incompatible with the other components of the hot melt adhesives to the extent that macropockets of crystallinity are formed on cooling. It has been found that suitable waxes include micro-crystalline and paraffin waxes from petroleum, synthetic waxes and natural waxes having a melting point of at least 150° F. and more preferably at least 160° F. The melting points of such waxes are generally in the range of 150 to 225° F. and preferably in the range of 160 to 200° F.

Suitable synthetic waxes are those produced in the Fischer-Tropsch process. Other suitable synthetic waxes include the amines of hydrogenated tallow fatty acids, metaterphenyl and the ketones of long change fatty acids such as behenone and the like.

Suitable natural waxes are carnauba, montan, ouricury, shellac, sugar cane (refined wax), raffia, esparto wax and the like.

In addition to having the proper melt point, the waxes employed in producing good creep properties of the instant hot melt adhesive compositions must be water insoluble. The wax component may be a single wax or a blend of the various suitable waxes.

The hot melt adhesive is prepared by mixing the ingredients at a temperature in the range of 200° to 400° F. Preferably the lowest temperature that will result in sufficient softening of all the ingredients is used. This prevents unnecessary oxidation of the compositions and is most economical. In the instant case, temperatures in the range of 225 to 325° F. are preferred. Usually the mixing is carried on at about 295° F.

Mixing may be carried out in any suitable manner. Satisfactory mixing is easily carried out in a heated sigma blade mixer. The mixing is continued until the adhesive composition is homogeneous.

For application to a surface, the adhesive is heated to a temperature in the range of 250 to 450° F. Generally, the lowest temperature that produces the viscosity desired and suitable for the particular application of the hot melt adhesive is employed.

The hot melt adhesives were screened by a simple test.

The test is the tear seal test. The sample is made on 50 pound kraft paper cut into ½ by 5½ inch strips. Each strip is coated on a single side for a length of one inch with a 1 mil. coating of hot melt adhesive. Then two 1 by ½ inch adhesive areas are placed together and the adhesive area heated with 2¾ pounds of pressure applied to remelt the hot melt adhesives and form a bond. The sample then consists of two layers of paper bonded together on internal surfaces over a 1 by ½ inch area at one end. The temperature of the heat sealing of the sample is adjusted so that all adhesives have approximately the same viscosity when sealed.

The test is made by securing the free end of one strip to a stationary mounting and securing the free end of the other strip to a pulling arm all of which is mounted in a variable temperature cabinet maintained at a constant temperature for each sample. When the pulling arm is activated, it pulls perpendicular to the plane of the bond at the rate of 4½ inches per minute.

A series of samples on a particular hot melt composition is run at 5° F. intervals upward until there is a failure of the bond in the adhesive. The temperature of the adhesive bond failure is recorded and the fiber tear is recorded as the next preceding temperature reading. A particular sample is conditioned at the test temperature for 10 minutes prior to testing.

In the instant test a fiber tear seal of 130° F. is acceptable, preferably 140° F. The samples tested below have fiber tear seals of greater than 140° F. To evaluate the properties of the corrugated paper board produced from the compositions of the present invention, a series of runs were made on a one-inch ("slice") corrugator at 300 feet per minute to produce a single facer corrugated paper board. The results are set out in Table II. Samples of the one-inch board were qualitatively examined and pulled apart by hand to determine the nature of the bond. The apparatus employed in the corrugating runs is designed to reproduce operations on full scale machines and is located at the Institute of Paper Chemistry, Appleton, Wis.

TABLE II

| Example | 1 | 2 | 3 | 4 | 5 |
| --- | --- | --- | --- | --- | --- |
| Elvax: | | | | | |
| Type | 150 | 360 | 360 | 360 | 360 |
| Parts by wt | 40 | 40 | 40 | 40 | 40 |
| Formolite resin:[1] | | | | | |
| R&B Softening Point, °C | 105 | 105 | 105 | 105 | 105 |
| Parts by wt | 60 | 40 | 40 | 40 | 40 |
| Wax: | | | | | |
| Type | | Microcrystalline petroleum | | | |
| Melting Pt., °F | | 193 | 193 | 193 | 193 |
| Parts by wt | | 20 | 20 | 20 | 20 |
| Polyhydroxy compound: | | | | | |
| Type | | | D-glucose (anhydrous) | | |
| Melting Pt., °C | | | 146 | 146 | 146 |
| Parts by wt | | | 16 | 25 | 40 |
| R&B Softening Pt. of Composition, °C | 92 | 98 | | | |
| Quality of Bond at 300 Ft. per min.: | | | | | |
| Initial [2] | Good | Fair | Fair | Poor-Fair | Poor-Fair |
| Aged [3] | Fair | Poor | Poor | Poor-Fair | Poor |

[1] Contains 1 part by weight of antioxidant (BHT).
[2] Initial=Samples examined and pulled apart immediately after production.
[3] Aged=Allowed to stand 72 hours at room temperature and humidity then pulled apart.
Poor=Bond has some strength; failure occurs in the cohesive strength of glue line or lack of penetration in medium and liner; no fiber tear.
Poor-Fair=Very slight fiber tear, either medium or liner; failure occurs in cohesive strength in glue line or lack of penetration in medium or liner.
Fair=Fiber tear exhibited by either medium or liner; failure occurs in cohesive strength of glue line; penetration of medium or liner is exhibited.
Good=Fiber tear exhibited; considerable difficulty encountered in checking bond strength due to delamination of liner and cohesive strength properties of adhesive.

It can be seen from Table II that the compositions of the present invention produced corrugated board of substantially the same quality as those produced from the unimproved compositions. The one-inch corrugator did not perform entirely as anticipated. Thus, samples for evaluation were prepared on a 14-inch corrugator also located at the Institute of Paper Chemistry which produced samples of good quality for each of the compositions tested.

These samples were subjected to a pin adhesive test which is the force in pounds on a six-square inch area of corrugated board required to separate the corrugating medium from the liner when the force is applied perpendicular to the liner. These samples were also subjected to an edgewise compression test. In this test, a cylinder having a 4-inch diameter is formed from the single faced corrugated board. Force measured in pounds per inch is applied perpendicular to the axis of the cylinder across the top of the cylinder and the force recorded when the first failure of the corrugated medium-line bond occurs, which is usually a collapse of some portion of the cylinder wall. The adhesives tested and the results are set out in Table III.

TABLE III

| Example | 6 | 7 | 8 |
|---|---|---|---|
| Elvax: | | | |
| Type | 360 | 360 | |
| Parts by wt | 40 | 40 | |
| Formolite Resin:[1] | | | |
| R&B Softening pt., °C | 105 | 105 | |
| Parts by wt | 40 | 40 | |
| Wax: | | | |
| Type | | Microcrystalline petroleum | |
| Melting Pt. °F | | 193 | 193 |
| Starch, Parts by wt | | | 95 |
| Resorcinol Resin, Parts by wt | | | 5 |
| Polyhydroxy Compound: | | | |
| Type | | D-glucose (anhydrous) | |
| Melting Pt., °C | | 146 | |
| Parts by wt | | 25 | |
| R&B Softening Pt. of Composition, °C | 98 | | |
| Edgewise Compression (Jumbo Ring), lbs./in.: | | | |
| Std. Conditions[2] | 35 | 32.8 | 37.4 |
| High Moist[3] | 31.6 | 30.5 | 30.4 |
| Pin Adhesion, lbs./6 sq. in.: | | | |
| Std. Condition[2] | 86 | 90 | 110 |
| High Moist[3] | 82 | 96 | 110 |

[1] Contains 1 part by weight of antioxidant (BHT).
[2] Sample preconditioned for 48 hours at 73° F. and 50% relative humidity.
[3] Sample preconditioned for 24 hours at 70° F. and 93-97% relative humidity.

It can be seen from Table III, Example 7 which is a composition according to the present invention, that the present composition is essentially equal to the unmodified hot melt adhesive in physical properties as well as having the other advantages of hot melts. Example 8 is a high quality, conventional, starch based, water soluble adhesive containing resorcinol.

Examples 9–16

A sample of each single faced corrugated board prepared above is soaked in water and beaten in a blender at speeds comparable to those used in a hollander type beater. The furnish is then spread on a small scale Fourdrinier wire cloth belt, the excess water is removed by passing the screen through a series of pressure rolls and the wet sheet subsequently dried. The results are set out in Table IV in terms of adhesive remaining in the openings of the wire belt.

TABLE IV

| Example | Corrugated Board from Example— | Condition of Wire Cloth Belt |
|---|---|---|
| 9 | 1 | Some openings clogged. |
| 10 | 2 | Do. |
| 11 | 3 | Wire cloth clean. |
| 12 | 4 | Do. |
| 13 | 5 | Do. |
| 14 | 6 | Some openings clogged. |
| 15 | 7 | Wire cloth clean. |
| 16 | 8 | Do. |

Thus the instant composition possesses essentially all of the advantages of hot melt adhesives and water based adhesives.

In addition to the components specified above, the adhesive compositions of the present invention can contain functional materials such as plasticizers, tackifiers, fillers, solvents, thinners, antioxidants, surfactants and coloring agents.

Suitable plasticizers include the phthalates such as dioctylphthalate, butyl benzyl phthalate, butyl cyclohexyl phthalate, etc.; phosphate esters, such as tricresyl phosphate, cresyl diphenyl phosphate; sulfonamides; chlorinated biphenyls; hydrocarbon oils, waxes, etc.

The examples presented herein above are intended to be merely illustrative and are not intended to limit the scope of the claims. Certain ranges of components have been specified, and it is to be understood that those of skill in the art will be able to select the respective proportion from each range so as to produce compositions within the spirit and scope of the invention. The examples provide the guidelines to indicate to those of skill in the art the means and manner of component selection and compounding.

The invention claimed is:

1. A thermoplastic hot melt adhesive composition comprising a mixture of from 35 to 75 parts by weight of an aromatic hydrocarbon-aldehyde resin having a ring and ball softening point in the range of from 70 to 150° C., from 25 to 65 parts by weight of ethylene-vinyl acetate copolymer containing from 17 to 42 weight percent vinyl acetate and from 5 to 40 parts by weight of a water soluble, crystalline polyhydroxy compound having 3 or more hydroxyl groups and 4 to 18 carbon atoms per molecule, and a melting point of at least 100° C.

2. A composition according to claim 1 wherein the ethylene-vinyl acetate has a ring and ball softening point in the range of 180 to 310° F.

3. A composition according to claim 2 wherein the aromatic hydrocarbon-aldehyde resin has a ring and ball softening point in the range of from 90 to 140° C.

4. A composition according to claim 3 wherein the polyhydroxy compound has a melting point in the range of 100 to 250° C.

5. A composition according to claim 1 wherein the ethylene-vinyl acetate copolymer contains 17 to 30 weight percent vinyl acetate.

6. A composition according to claim 5 with 10 to 25 parts by weight of a crystalline wax having a melting point of at least 150° F.

7. A composition according to claim 6 wherein the wax has a melting point in the range of 150 to 225° F.

8. A composition according to claim 7 wherein the wax has a melting point in the range of 160 to 200° F.

9. A composition according to claim 8 wherein the the aromatic hydrocarbon-aldehyde resin has a ring and ball softening point in the range of 90 to 140° C.

10. A composition according to claim 9 wherein the polyhydroxy compound has a melting point in the range of 100 to 250° C.

11. A composition according to claim 10 wherein the polyhydroxy compound is selected from the group consisting of polyhydric alcohols and saccharides.

12. A composition according to claim 9 wherein the wax is a microcrystalline wax derived from petroleum.

13. A composition according to claim 12 wherein the polyhydroxy compound is anhydrous D-glucose.

14. A composition according to claim 12 wherein the polyhydroxy compound is sorbitol.

15. A composition according to claim 12 wherein the polyhydroxy compound is pentaerythritol.

References Cited

UNITED STATES PATENTS

| 2,490,550 | 12/1949 | Sermattei | 260—28.5 |
| 2,613,191 | 10/1952 | McGaffin et al. | 260—29.2 |
| 2,760,942 | 8/1956 | Oakley | 260—17.4 |
| 3,175,986 | 3/1965 | Apikos et al. | 260—28.0 |
| 3,262,996 | 7/1966 | Kurtz et al. | 260—887 |
| 3,281,876 | 11/1966 | Lowe et al. | 12—146 |
| 3,325,562 | 6/1967 | Peterkin | 260—897 |
| 3,342,902 | 9/1967 | Peterkin | 260—897 |
| 3,419,641 | 12/1968 | Peterkin et al. | |

WILLIAM H. SHORT, Primary Examiner

E. NIELSEN, Assistant Examiner

U.S. Cl. X.R.

117—155, 156, 161, 165; 156—328. 332; 161—251, 30.6, 30.8, 31.8, 33.6, 33.8, 897